United States Patent

Mochizuki et al.

[11] Patent Number: 6,090,430
[45] Date of Patent: Jul. 18, 2000

[54] METHOD OF MANUFACTURING HIGH PRESSURE GAS CHARGED CANDY AND HIGH PRESSURE GAS CHARGING APPARATUS FOR PUTTING SAME INTO PRACTICE

[75] Inventors: Keizo Mochizuki; Mitsuo Yamaguchi, both of Saitama-ken, Japan

[73] Assignee: Meiji Seika Kaisha, Ltd., Tokyo, Japan

[21] Appl. No.: 09/147,816

[22] PCT Filed: Jul. 18, 1997

[86] PCT No.: PCT/JP97/02498

§ 371 Date: Apr. 8, 1999

§ 102(e) Date: Apr. 8, 1999

[87] PCT Pub. No.: WO99/03357

PCT Pub. Date: Jan. 28, 1999

[51] Int. Cl.[7] .................................................. A23G 3/00
[52] U.S. Cl. .................. 426/572; 426/474; 426/660; 99/483; 99/516; 99/517
[58] Field of Search ................. 127/9, 12; 426/572, 426/474, 660, 571, 524; 99/474, 516, 517, 483, 323.1; 261/76, 113, 77

[56] References Cited

U.S. PATENT DOCUMENTS

| | | | |
|---|---|---|---|
| 3,012,893 | 12/1961 | Kremzner et al. | 99/134 |
| 3,985,909 | 10/1976 | Kirkpatrick | 426/572 |
| 3,985,910 | 10/1976 | Kirkpatrick | 426/572 |
| 4,000,321 | 12/1976 | Mochizuki et al. | 426/5 |
| 4,001,457 | 1/1977 | Hegadorn | 426/572 |
| 4,104,412 | 8/1978 | Fisher et al. | 426/572 |
| 4,262,029 | 4/1981 | Kleiner et al. | 426/512 |
| 4,273,793 | 6/1981 | Fariel et al. | 426/572 |
| 4,289,794 | 9/1981 | Kleiner et al. | 426/660 |
| 4,334,934 | 6/1982 | Barnes et al. | 127/9 |
| 4,637,788 | 1/1987 | Richards | 425/261 |
| 4,666,730 | 5/1987 | Mergelsberg | 426/572 |
| 4,837,039 | 6/1989 | Escola Gallart et al. | 426/572 |
| 4,867,999 | 9/1989 | Mergelsberg et al. | 426/520 |
| 4,935,189 | 6/1990 | Mochizuki et al. | 426/474 |
| 5,023,098 | 6/1991 | Sumi et al. | 426/474 |
| 5,064,651 | 11/1991 | Mochizuki et al. | 424/440 |
| 5,165,951 | 11/1992 | Gallart et al. | 426/572 |
| 5,279,842 | 1/1994 | Escola Gallart et al. | 426/282 |
| 5,298,266 | 3/1994 | Mergelsberg et al. | 426/511 |
| 5,439,698 | 8/1995 | Ahn et al. | 426/572 |

Primary Examiner—Cynthia L. Nessler
Attorney, Agent, or Firm—Arent Fox Kintner Plotkin & Kahn PLLC

[57] ABSTRACT

There are provided a method of producing a pressurized gas-entrapping candy and a pressurized gas-entrapping apparatus to be used for the method. According to the method, the pressurized gas-entrapping candy is produced by preparing a hard candy with a conventional method, crushing the hard candy and sieving to obtain candy particles, attaching a pipe with fine holes in its peripheral wall to a cylindrical vessel through an opening formed in a lid of the cylindrical vessel, filling the candy particles in a space between the cylindrical vessel and the pipe, loading the cylindrical vessel in a long and cylindrical pressure-resistant vessel, feeding heating steam and then cooling water to a jacket portion of the pressure-resistant vessel, while maintaining pressurized state in the pressure-resistant vessel, to carry out heating and cooling treatments of the candy particles in the cylindrical vessel, and then releasing the pressurized state of the pressure-resistant vessel.

8 Claims, 2 Drawing Sheets

METHOD OF MANUFACTURING HIGH PRESSURE GAS CHARGED CANDY AND HIGH PRESSURE GAS CHARGING APPARATUS FOR PUTTING SAME INTO PRACTICE

This application is a national stage application filed under 35 USC 371 of PCT application PCT/JP97//02498, filed Jul. 18, 1997.

TECHNICAL FIELD

The present invention relates to a method of producing pressurized gas-entrapping candy and a pressurized gas-entrapping apparatus for carrying out the method.

BACKGROUND ART

A pressurized gas-entrapping candy, namely that a candy entrapping fine bubbles of pressurized gas in a hard candy piece and generating pleasing sound due to explosion of the bubbles, as it puts and melts in mouth or water is one of products having been accorded a favorable reception in the market.

Various methods have been proposed for producing such a pressurized gas-entrapping candy. According to methods disclosed in U.S. Pat. Nos. 3,985,909 and 4,001,457, for instance, the pressurized gas-entrapping candy is produced by charging a condensate f or hard candies into a pressure vessel, charging pressurized carbon dioxide gas of 400–700 psi (about 30–50 kg/cm$^2$) into the pressure vessel, stirring the condensate by an agitator arranged in the pressure vessel at 400–500 rpm to entrap the pressurized gas in the candy condensate, cooling the candy condensate to make its temperature to 70° F. (about 20° C.) and then releasing the pressure due to carbon dioxide gas, and opening the pressure vessel at the time when the inner pressure of the pressure vessel has dropped to atmospheric one.

According to a method disclosed in U.S. Pat. No. 4,935,189 (corresponding to JP-B 2,556,718 and EP-B-0 326 692) developed by the present inventors, while, the pressurized gas-entrapping candy is produced by firstly preparing a hard candy piece, crushing the same and sieving to obtain candy particles, charging the resulting candy particles in a mold to press the same and to prepare a pre-shaped candy piece, charging the pre-shaped porous candy piece into a pressure vessel, charging pressurized carbon dioxide gas into the pressure vessel, heating the porous pre-shaped candy piece to cause a partial melting of the particles constituting the candy piece and to entrap the carbon dioxide gas therein as fine bubbles, cooling the pressure vessel, while keeping inner pressure of the pressure vessel in a high level, releasing the pressure in the pressure vessel, and opening the pressure vessel. According to another method disclosed in U.S. Pat. No. 5,023,098 developed by the present inventors as in the above method, a pressurized gas-entrapping candy is produced by subjecting a condensate for hard candies to a pulling operation to entrap air therein as fine bubbles, shaping the air-entrapped condensate to convert into an air-entrapped candy piece, dipping the shaped candy piece into liquid nitrogen to solidify the same and to form cracks which break air bubbles in the shaped candy piece, charging the cracked candy piece into a pressure vessel, and thereafter, carrying out the steps similar to the method as disclosed in said U.S. Pat. No. 4,935,189.

Among the prior art methods of producing the pressurized gas-entrapping candy, the method disclosed in U.S. Pat. Nos. 3,985,909 and 4,001,457 requires an expensive pressure vessel with the agitator for entrapping therein as fine bubbles pressurized carbon dioxide gas through steps of charging heated candy condensate into the pressure vessel and stirring the condensate under high pressure condition of 400–700 psi. Particularly, a special pressure-resistant part at bearing portion of the agitator to prevent leakage of the pressurized gas. Further, the condensate for hard candy shows higher viscosity even though under temperature condition in an extent of 100° C. and thus a powerful electric motor is required for carrying out the high-speed stirring, and therefore a cost on incidental facilities not only increase, but higher technical level is also required. Moreover, in the production procedure, the candy condensate adhered on inner wall of the pressure vessel shall change in its quality and solidified thereon by the heat of a jacket for the pressure vessel and thus it is impossible to carry out the continuous producing operation over 8 hours.

In the method disclosed in U.S. Pat. No. 4,935,189, wherein the prepared hard candy particles are accommodated in a cylindrical vessel to shape by press operation and then the resulting shaped porous hard candy piece is accommodated in the pressure vessel to carry out pressurized gas-entrapping operation, a size of the porous hard candy piece cannot be set so large, in relation to required period of time of thermal transmission from a jacket to core portion of the porous hard candy piece through the pressurized gas, and thus the production efficiency is somewhat low. On the other hand, in the method disclosed in U.S. Pat. No. 5,023,098 including steps of that the pulling operation is carried out to introduce air bubbles in the concentrate for hard candies and that the air-entrapped candy piece is dipped into liquid nitrogen to solidify and to form cracks for breaking the air bubbles, a required period of time becomes longer for forming uniform and fine air bubbles in the candy concentrate and the use of liquid nitrogen increases a cost and requires special facilities.

Therefore, purposes of the present invention provide a pressurized gas-entrapping apparatus for a candy which is simple in structure as well as a method of producing a pressurized gas-entrapping candy which is continuously operable and excellent in production efficiency, so that a large amount production is possible and production cost shall also decrease.

Disclosure of Invention

A pressurized gas-entrapping apparatus for candies and according to the invention comprises a body which has a jacket communicating with pipes for charging and discharging heating steam as well as pipes for charging and discharging cooling water, a long and cylindrical pressure-resistant vessel having a sealing lid at each end and communicating with pipes for charging and discharging pressurized gas, and a stand for supporting said pressure-resistant vessel, a cylindrical vessel having outer diameter smaller than inner diameter of said pressure-resistant vessel and a lid with a central opening, which cylindrical vessel is to be filled with hard candy particles and loaded into said pressure-resistant vessel, and a pipe to be fittingly inserted to the opening formed in the lid of said cylindrical vessel and having fine holes in its peripheral wall at a portion to be positioned within said cylindrical vessel.

In the pressurized gas-entrapping apparatus according to the invention, it is preferable that the pressure-resistant vessel has a size in entire length of 10 m or less and inner diameter of 150 mm or less. Each of those grounds are as follows. If the length exceeds 10 m, observation of inner portion of the pressure-resistant vessel and possible cleaning thereof become difficult and thus not preferable in working. If the inner diameter is larger than 150 mm, while, required thermal transmission period of time for uniformly and partially melting candy particles filled in the cylindrical vessel to form fine bubbles of the pressurized gas becomes to about 60 minutes to lower working efficiency, and if the thermal transmission period of time exceeds 60 minutes, candy particles near the side contacting with inner wall of the jacket of the pressure-resistant vessel become overheated state to make difficult a desired entrapping of the pressurized gas therein. The pressure-resistant vessel may be arranged in inclined state within a range of 5 degrees or less to the horizontal surface, to make easy loading and unloading of the cylindrical vessel therein. The ground of limitation on the inclination angle lies in as follows. When the candy particles in the cylindrical vessel is heated, there is no apprehension of leaking of molten candy particles into the pressure-resistant vessel, but if the pressure-resistant vessel shall be arranged with inclination angle of more than 5 degrees and over-melting shall occur to the candy particles, molten candy shall gather at bottom of the cylindrical vessel to make difficult a desired entrapping of the pressurized gas.

While, it is preferable that the cylindrical vessel has a size in entire length of 1m or less and outer diameter of less than 150 mm in view of the inner diameter of pressure-resistant vessel and more preferably 110 mm or less. Because, if the outer diameter of cylindrical vessel is made near the inner diameter of pressure-resistant vessel, the working for unloading of the cylindrical vessel from the pressure-resistant vessel becomes troublesome and pressurized gas-entrapping efficiency shall decrease, since candy particles positioned at or near inner wall of the cylindrical vessel are heated by the jacket portion of the pressure-resistant vessel directly through the wall of cylindrical vessel or slight space in addition to the wall, so that there is possibility to cause over-heated state thereto.

The ground of that the pressure-resistant vessel is made larger in length and the cylindrical vessel, in which the candy particles are filled, is made short, in the pressurized gas-entrapping apparatus according to the invention lies in that the thermal transmission for charging heating steam into the jacket of the pressure-resistant vessel under pressure by the pressurized gas to cause partial or entire melting of the candy particles in the cylindrical vessel and then charging cooling water into the jacket to cause entrapping the pressurized gas in the candy as fine bubbles is basically carried out by the pressurized gas per se to be heated and then cooled by the jacket portion and thus it necessary to set larger an area of the jacket portion in the pressure-resistant vessel to ensure the temperature control of the pressurized gas, and that candy particles different in taste or flavor are charged in plural cylindrical vessels which are loaded in the pressure-resistant vessel to make possible a current production of pressurized gas-entrapping candies different in those taste.

The pipe to be fittingly inserted into the opening formed in the lid of the cylindrical vessel serves to lead the pressurized gas to be heated or cooled by jacket portion of the pressure-resistant vessel to a mass of the candy particles in the cylindrical vessel and form of the fine holes formed therein and communicating an inner space of the pressure-resistant vessel with inner space of the cylindrical vessel may be of circle, slit, net or the like. It is preferable to have a diameter of 10–30 mm for the pipe. Because, thermal transmission to the candy particles charged in the cylindrical vessel shall delay to reduce production efficiency of the pressurized gas-entrapping candy, if the diameter of the pipe is less than 10 mm. While, if the diameter of pipe is larger than 30 mm, an amount of candy particles to be charged in the cylindrical vessel shall decrease in connection with a size (inner diameter) of the cylindrical vessel. If the fine holes formed in the pipe has circular form, a diameter of 1–3 mm is preferable therefor. Because, if the diameter is less than 1 mm, a blockade thereof shall occur to reduce a gas entering efficiency into inner space of the cylindrical vessel and while, if the diameter is larger than 3 mm, a part of candy particles enters into inner space of the pipe, when the candy particles shall be charged into the cylindrical vessel and the cylindrical vessel shall be entered into the long pressure-resistant vessel to decrease candy production efficiency.

To manufacture a pressurized gas-entrapping candy by using said pressurized gas entrapping apparatus, in the first place, it necessary to prepare hard candy particles to be charged into the cylindrical vessel. Although there is no interruption in using of a formulation of raw materials for the production of general hard candies, a formulation of 25–30 parts by weight of sugar, 25–30 parts by weight of lactose and 40–50 parts by weight of starch hydrolysate is preferable, since such a formulation for more hardy candy makes possible to entrap a gas higher in its pressure, when a pressurized gas-entrapping candy as objective substance shall be manufactured, so that sound pressure to be generated in mouth becomes higher to give a better product.

A method of preparing a condensate for a candy with use of such a formulation and of obtaining hard candy particles is similar with a conventional one.

Therefore, a method of manufacture of pressurized gas-entrapping candy according to the invention is characterized by steps of composing 25–30 parts by weight of sugar, 25–30 parts by weight of lactose and 40–50 parts by weight of starch hydrolysate and condensing the composition to prepare a condensate for a hard candy, shaping the condensate, cooling, crushing and sieving to prepare candy particles, charging the candy particles in a cylindrical vessel which has a lid with a central opening, in which a pipe having fine holes in its peripheral wall, loading the cylindrical vessel filled with the candy particles into a long and cylindrical pressure-resistant vessel which has a jacket with pipes for charging and discharging heating steam and pipes for charging and discharging cooling water, having a sealing lid at each end and communicating with pipes for charging and discharging pressurized gas, charging the pressurized gas into the pressure-resistant vessel, charging the heating steam into the jacket of the pressure-resistant vessel to raise temperature of the hard candy particles in the cylindrical vessel, stopping the feeding of the heating steam at the time when temperature of a mass in the cylindrical vessel has reached a predetermined one and charging cooling water into the jacket, and releasing the pressurized state of the pressure-resistant vessel due to the pressurized gas at the time when the temperature of the product lowered to a predetermined one.

A ratio of 1:1 for the sugar to lactose is preferable for carrying out the method according to the invention. If the ratio of the both materials is different in a larger extent, crystallization shall occur during the high-pressure treatment to make difficult entrapping the pressurized gas as fine bubbles, although the cause thereof has not been made apparent. It is preferable to compose the starch hydrolysate in an amount of 40–50 parts by weight and an amount thereof less than 40 parts by weight is not preferable, since the sugar and lactose are apt to be crystallized. If the starch hydrolysate shall be composed in an amount more than 50 parts by weight, while, solubility of the pressurized gas-entrapping candy to be obtained becomes worse and thus it is not preferable in generation of sound in mouth.

The raw materials for the hard candy in said ratio are condensed by using a conventional continuous condenser such as a kettle type condenser until moisture content of the condensate becomes 2% or less, and the condensate is shaped to a optional form, cooled to cause solidification thereof, and crushed the solidified mass, so that the resulting candy particles pass through a standard 40 mesh sieve based on the Japanese Industrial Standards (JIS). The ground of that particle size is set to less than 40 mesh lies in that if it is larger, a part entrapping no pressurized gas shall be formed, so that generation of sound becomes weak in mouth.

After the pipe with fine holes in its peripheral wall is inserted into the cylindrical vessel to fully charge the candy particles in a space between outer wall of the pipe and inner wall of the cylindrical vessel and to fit the lid of cylindrical vessel, the cylindrical vessel(s) are loaded into the long and cylindrical pressure-resistant vessel and then inner pressure of the pressure-resistant vessel is increased by the pressurized gas which may be of carbon dioxide gas or nitrogen gas. In this case, it is preferable to set the pressure in the pressure-resistant vessel to 35–60 $kgf/cm^2$. If the inner pressure is less than 35 $kgf/cm^2$, sound pressure to be generated, when the pressurized gas-entrapping candy as final products shall melt in mouth, becomes low and while, if the inner pressure is higher than 60 $kgf/cm^2$, the pressure excesses pressure-resistant power of the pressurized gas-entrapping candy per se to cause an explosion thereof and as a result, desired pressurized gas-entrapping candy generating pleasure sound cannot be obtained.

After that the inner pressure has reached a predetermined level, heating steam is charged into the jacket of pressure-resistant vessel to increase temperature of the candy particles in the cylindrical vessel(s) to 100–150° C. through the pressurized gas heated by the heating steam in the jacket. If the temperature of mass of candy particles is less than 100° C., sufficient partial melting of the candy particles shall not occur, so that pressurized gas-entrapping candy with the pressurized gas in the form of fine bubbles can not be obtained and while, if the temperature of mass of candy particles is set to that higher than 150° C., over-melting of the candy particles shall occur, so that desired pressurized gas-entrapping candy with the pressurized gas in the form of fine bubbles can also not be obtained. In actual operation, it is preferable to set as that the temperature of mass of candy particles becomes in a range of 120–145° C.

If the temperature of mass of candy particles has reached said range, the heating steam is immediately discharged and cooling water is charged into the jacket to cool mass of the pressurized gas-entrapping candy in the cylindrical vessel until its temperature becomes less than 30° C.

Then, the feeding of pressurized gas is stopped to discharge the same from the pressure-resistant vessel and when the inner pressure in the pressure-resistant vessel has reached a level of atmospheric pressure, a door or lid of the pressure-resistant vessel is opened to take-out the cylindrical vessel(s) therefrom, and then the lid of the cylindrical vessel(s) is removed to take-out the pressurized gas-entrapping candy in the form of a thick cylinder, together with the pipe. Thereafter, the pipe is drawn-out and the thick cylindrical mass of pressurized gas-entrapping candy is crushed to obtain desired pressurized gas-entrapping candy products with suitable size.

BEST MODE FOR CARRYING OUT THE INVENTION

A pressurized gas-entrapping apparatus for candies according to the invention shall be explained with reference to drawings and a production of pressurized gas-entrapping candy using the apparatus shall be explained by concrete Examples.

Figure 1:
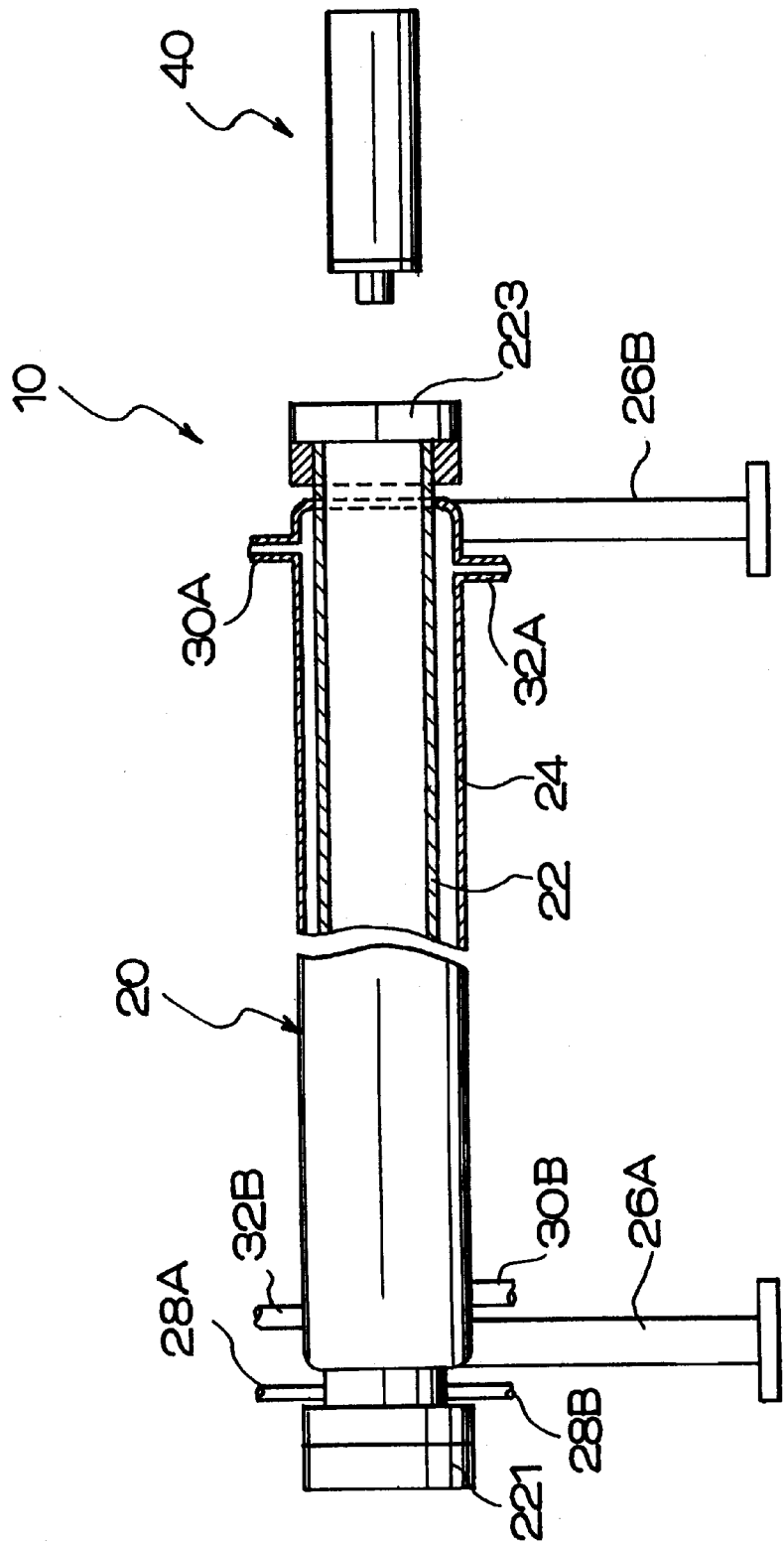
FIG. 1 is an illustrative vertical view, a part thereof being shown in section, to show a body of pressurized gas-entrapping apparatus for candies, according to the invention and a cylindrical vessel to be accommodated in the body.

In FIG. 1, the pressurized gas-entrapping apparatus 10 for the production of pressurized gas-entrapping candies comprises a body 20 and a cylindrical vessel 40 to be loaded in the body. The body 20 has a long and cylindrical pressure-resistant vessel 22 with sealing lids 221, 223 at each end, a jacket 24 covering the pressure-resistant vessel over substantially its entire length, and stands 26A, 26B for supporting the pressure-resistant vessel together with the jacket.

To the pressure-resistant vessel 22, a charging pipe 28A and discharging pipe 28B for pressurized gas are connected, so that the pressurized gas can be charged into and discharged from the pressure-resistant vessel. To the jacket portion, there are connected a charging pipe 30A and discharging pipe 30B for heating steam as well as charging pipe 32A and discharging pipe 32B for cooling water, so that heating or cooling of the pressure-resistant vessel from its outer peripheral surface can be attained to heat or cool the pressurized gas charged in the pressure-resistant vessel. The pressure-resistant vessel with the jacket is horizontally arranged by the stands but can be inclined within a range of 5 degrees by a jack device (not shown).

Figure 2:
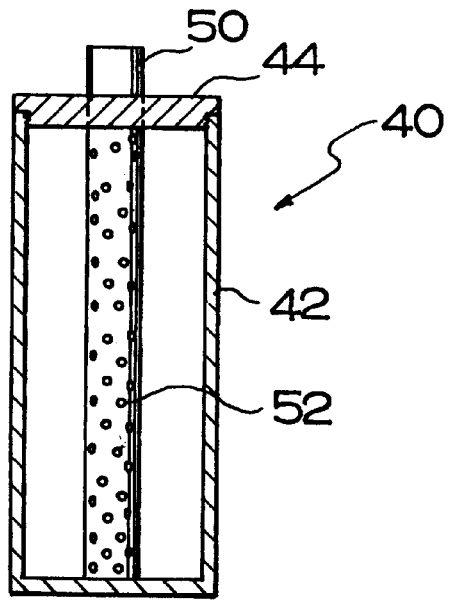
FIG. 2 is a view of the cylindrical vessel shown in FIG. 1, a part thereof being shown in section, to show a relation thereof with an associated pipe inserted therein.

As shown in FIG. 2, the cylindrical vessel 40 has a body 42 and a lid 44 with a central opening (not shown), to which a pipe 50 is fittingly inserted. The pipe has fine holes 52 at its portion accommodated in the cylindrical vessel. The fine holes may be arranged in random as shown or formed in rows with same or substantially same interval, and its shape may be of a slit or net.

Hard candy particles (not shown) are filled in a space between inner wall of the body 42 in the cylindrical vessel 40 and peripheral wall of the pipe 50 which is fittingly inserted through the opening formed in the lid 44, and such a cylindrical vessel accommodated candy particles therein is then loaded in the pressure-resistant vessel 22 of the body 20 in the pressurized gas-entrapping apparatus 10 to carry out a series of such operations as charging pressurized gas into the pressure-resistant vessel, feeding of heating steam into the jacket 24, discharging of the heating steam, feeding of cooling water into the jacket 24, discharging of the cooling water and discharging of the pressurized gas, whereby a mass of pressurized gas-entrapping candy in the form of a thick cylinder and entrapping the pressurized gas in the form of fine bubbles is formed in the cylindrical vessel, the cylindrical vessel being taken-out from the pressure-resistant vessel 22 and the mass being taken-out from the cylindrical vessel 40 to crush the same for merchandising it as pressurized gas-entrapping candy products with a suitable size.

Figure 3:
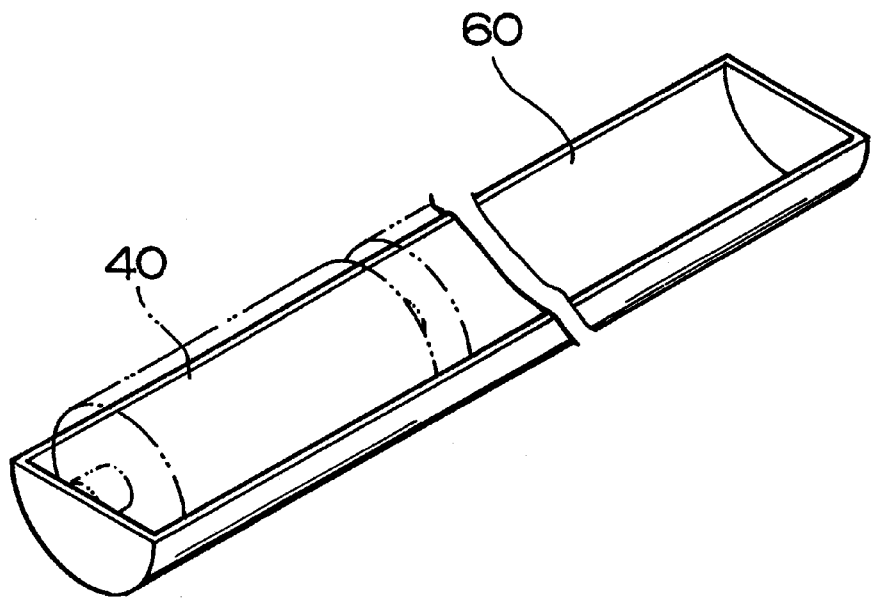
FIG. 3 is a perspective view of a support to be used when plural cylindrical vessels with the pipe are loaded in a pressure-resistant vessel of the body in pressurized gas-entrapping apparatus, by arranging the same in tandem manner.

The pressure-resistant vessel has a longer size in comparison with entire length of the cylindrical vessel accommodating candy particles therein, so that it may accommodate 2 or more cylindrical vessels therein. In such a case, loading of the cylindrical vessels into the pressure-resistant vessel and unloading the same therefrom can be made easy, if a gutter-like support 60 as shown in FIG. 3 is used for accommodating plural cylindrical vessels therein. When plural cylindrical vessels shall be loaded into the pressure-resistant vessel, such a case may be thought that free end of the pipe contacts with bottom surface of a forwardly arranged cylindrical vessel to prevent an invasion of pressurized gas into the rearward arranged cylindrical vessel, but this problem can be solved by aslant cutting free end of the pipe.

Example 1

To raw materials of sugar (40 parts by weight), lactose (30 parts by weight) and a starch hydrolysate (saccharified by an acid, 40 parts by weight), water was added to mix the same to prepare a mixture (water content: 25%) which was subjected to a condensing operation by using an installation for the manufacture of conventional hard candies to obtain a condensate having moisture content of 1.5%. To the condensate, a flavor (0.5 parts by weight) and a coloring matter (0.2 parts by weight) were added to mix and homogenize by using a conventional kneading machine, and the kneaded mass was treated by a roll-type shaping machine to obtain hard candies in the form of a drop. The drop-like hard candies were treated by a speed mill (Type ND-30S machine manufactured by Okada Seikoh Co., Ltd.) to crush the same and then sieved to obtain hard candy particles which pass through a 40 mesh sieve.

The hard candy particles were filled in a cylindrical vessel having its shape as shown in FIG. 2 and in a space between its inner wall and outer wall of a pipe. The cylindrical vessel has a size of 110 mm in outer diameter and 1 m in length and has a lid with a central opening of 10 mm in diameter, in which the pipe is fittingly inserted, the pipe having randomly arranged large number of fine holes of 1 mm in diameter at the portion accommodated in the cylindrical vessel.

The cylindrical vessel with the associated pipe and filled with candy particles was loaded in a pressure-resistant vessel of a body in a pressurized gas-entrapping apparatus as shown in FIG. 1. As referred to before, the body of pressurized gas entrapping apparatus has a jacket communicating with pipes for charging and discharging heating steam as well as pipes for charging and discharging cooling water, the long and cylindrical pressure-resistant vessel having a lid at each end and communicating with pipes for charging and discharging pressurized gas and stands for supporting the pressure-resistant vessel. The pressure-resistant vessel has a size of 150 mm in inner diameter and 5 m in length, and arranged in slanted state of 5 degrees to the floor or horizontal surface, although it has been shown in FIG. 1, as horizontal state.

Then, pressurized carbon dioxide gas was charged into the pressure-resistant vessel to increase its inner pressure to 50 kgf/cm$^2$. While maintaining the pressure condition, heating steam was charged into the jacket portion of the pressure-resistant vessel to increase temperature of the candy particles in the cylindrical vessel. When temperature of mass of candy particles had reached 140° C., the feeding of heating steam was immediately stopped to discharge the same and cooling water was charged into the jacket. When the mass of products had reached 25° C., the feeding of cooling water was stopped and then feeding of the pressurized gas was also stopped to discharge the same.

After confirmed a fact that inner pressure of the pressure-resistant vessel is same or substantially same with atmospheric pressure, the lid or door of the pressure-resistant vessel was opened to take-out the cylindrical vessel and the lid of cylindrical vessel was removed to take out a mass of pressurized gas-entrapping candy in the form of a thick cylinder together with the pipe, which mass was crushed to obtain pressurized gas-entrapping candy products having a suitable size.

Tasting showed that the candy products are desired pressurized gas-entrapping one with characteristics of generating a series of pleasing sound in mouth.

Example 2

To raw materials of sugar (25 parts by weight), lactose (25 parts by weight) and a starch hydrolysate (saccharified by malt, 40 parts by weight), water was added to mix the same to prepare a mixture (water content: 25%) which was subjected to a condensing operation by using an installation for the manufacture of conventional hard candies to obtain a condensate having moisture content of 2.0%. To the condensate, a flavor (0.5 parts by weight) and coloring matter (0.2 parts by weight) were added to mix and homogenize by using a conventional kneading machine, and the kneaded mass was treated as described in Example 1 to obtain hard candy particles which pass through a 40 mesh sieve.

The hard candy particles were filled in a cylindrical vessel having its shape as shown in FIG. 2 and in a space between its inner wall and outer wall of a pipe. The cylindrical vessel has a size of 100 mm in inner diameter and 0.6 m in length and has a lid with a central opening of 30 mm in diameter, in which the pipe is fittingly inserted, the pipe having randomly arranged large number of fine holes of 3 mm in diameter at the portion accommodated in the cylindrical vessel.

The cylindrical vessel with the associated pipe and filled with candy particles was loaded in a pressure-resistant vessel of a body in a pressurized gas-entrapping apparatus as in Example 1. In this Example, the pressure-resistant vessel has a size of 150 mm in inner diameter and 9 m in length and was horizontally arranged to the floor surface. Pressurized carbon dioxide gas was charged to the pressure-resistant vessel to adjust its inner pressure to 60 kgf/cm$^2$. While maintaining the pressure condition, heating steam was charged into a jacket portion of the pressure-resistant vessel to increase temperature of the candy particles in the cylindrical vessel. When temperature of mass of candy particles had reached 120° C., the feeding of heating steam was immediately stopped to discharge the same and cooling water was charged into the jacket.

Thereafter, procedures same with those in Example 1 were carried out to obtain pressurized gas-entrapping candy products.

Tasting showed that the candy products are desired pressurized gas-entrapping one with characteristics of generating a series of pleasing sound in mouth.

Industrial Applicability:

According to the method of the invention, a pressurized gas-entrapping candy is prepared by firstly preparing a hard candy with raw materials for a conventional hard candy and with a conventional method, crushing the hard candy and sieving to obtain candy particles, attaching a pipe with fine holes in its peripheral wall to a cylindrical vessel through an opening formed in a lid of the cylindrical vessel, filling the candy particles in a space between inner wall of the cylindrical vessel and outer wall of the pipe, loading the cylindrical vessel in a long and cylindrical pressure-resistant vessel of a pressurized gas-entrapping apparatus, and then subjecting to treatments of pressurizing, heating and cooling. Since the candy particles do not directly contact with jacket portion of the pressure-resistant vessel, therefore, thermal change in quality does not occur and since the cylindrical vessel with the pipe and filled with the candy particles is made like as a cartridge, the pressurized gas-entrapping candy can be produced in substantially continuous manner and in large amount to decrease production cost, if plural cylindrical vessels in such state are previously reserved.

What is claimed is:

1. A method of producing a pressurized gas-entrapping candy, which comprises steps of composing 25–30 parts by weight of sugar, 25–30 parts by weight of lactose and 40–50 parts by weight of starch hydrolysate and condensing the composition to prepare a condensate for a hard candy, shaping the condensate, cooling, crushing and sieving to prepare candy particles, charging the candy particles in a cylindrical vessel which has a lid with a central opening, in which a pipe having fine holes in its peripheral wall is fittingly inserted, loading the cylindrical vessel filled with the candy particles into a long and cylindrical pressure-resistant vessel which has a jacket with pipes for charging and discharging heating steam and pipes for charging and discharging cooling water, having a sealing lid at each end and communicating with pipes for charging and discharging pressurized gas, charging the pressurized gas into the pressure-resistant vessel, charging the heating steam into the jacket of the pressure-resistant vessel to raise temperature of the hard candy particles in the cylindrical vessel, stopping the feeding of the heating steam at the time when temperature of a mass in the cylindrical vessel has reached a predetermined one and charging cooling water into the jacket, and releasing the pressurized state of the pressure-resistant vessel due to the pressurized gas at the time when the temperature of the product lowered to a predetermined one.

2. A method for producing a pressurized gas-entrapping candy as claimed in claim 1, wherein said hard candy particles are made in a size passing through a 40 mesh sieve.

3. A method for producing a pressurized gas-entrapping candy as claimed in claim 1 or 2, wherein said pressurized gas is carbon dioxide gas or nitrogen gas, and inner pressure of the pressure-resistant vessel is set in a range of 35–60 $kgf/cm^2$.

4. A method for producing a pressurized gas-entrapping candy as claimed in claim 1, wherein temperature of the mass in said cylindrical vessel is made in a range of 100–150° C.

5. A pressurized gas-entrapping apparatus for pressurized gas-entrapping candies, comprising a body which has a jacket communicating with pipes for charging and discharging heating steam as well as pipes for charging and discharging cooling water, a long and cylindrical pressure-resistant vessel having a sealing lid at each end and communicating with pipes for charging and discharging pressurized gas, and a stand for supporting said pressure-resistant vessel, a cylindrical vessel having outer diameter smaller than inner diameter of said pressure-resistant vessel and a lid with a central opening, which cylindrical vessel is to be filled with hard candy particles and loaded into said pressure-resistant vessel, and a pipe to be fittingly inserted to the opening formed in the lid of said cylindrical vessel and having fine holes in its peripheral wall at a portion to be positioned within said cylindrical vessel.

6. A pressurized gas-entrapping apparatus for pressurized gas-entrapping candies as claimed in claim 5, wherein said pressure-resistant vessel has inner diameter of 150 mm or less and entire length of 10 m or less, and said cylindrical vessel has outer diameter of less than 150 mm and entire length of 1m or less.

7. A pressurized gas-entrapping apparatus for pressurized gas-entrapping candies as claimed in claim 5 or 6, wherein said pressure-resistant vessel is arranged horizontally or in slanted state not over than 5 degrees to a floor surface.

8. A pressurized gas-entrapping apparatus for pressurized gas-entrapping candies as claimed in claim 5, wherein diameter of fine holes formed in said pipe associating with said cylindrical vessel is in a range of 1–3 mm.

* * * * *

UNITED STATES PATENT AND TRADEMARK OFFICE
CERTIFICATE OF CORRECTION

PATENT NO. : 6,090,430
DATED : July 18, 2000
INVENTOR(S) : MOCHIZUKI ET AL.

It is certified that error appears in the above-identified patent and that said Letters Patent is hereby corrected as shown below:

Item [54], Please delete--METHOD OF MANUFACTURING HIGH PRESSURE GAS CHARGED CANDY AND HIGH PRESSURE GAS CHARGING APPARATUS FOR PUTTING SAME INTO PRACTICE--, and insert METHOD OF PRODUCING PRESSURIZED GAS-ENTRAPPING CANDY AND PRESSURIZED GAS-ENTRAPPING APPARATUS FOR CARRYING OUT THE METHOD.

Signed and Sealed this

Twenty-ninth Day of May, 2001

*Attest:*

NICHOLAS P. GODICI

*Attesting Officer*     Acting Director of the United States Patent and Trademark Office